(12) United States Patent
Ramanathaiah et al.

(10) Patent No.: US 9,098,834 B2
(45) Date of Patent: Aug. 4, 2015

(54) TASK MANAGEMENT USING ELECTRONIC MAIL

(75) Inventors: Gurudutta Ramanathaiah, Bangalore (IN); Rohit Koul, Jammu (IN)

(73) Assignee: Oracle International Corporation, Redwood Shores, CA (US)

( * ) Notice: Subject to any disclaimer, the term of this patent is extended or adjusted under 35 U.S.C. 154(b) by 806 days.

(21) Appl. No.: 12/646,964

(22) Filed: Dec. 23, 2009

(65) Prior Publication Data

US 2011/0154338 A1 Jun. 23, 2011

(51) Int. Cl.
  *G06F 15/16* (2006.01)
  *G06Q 10/10* (2012.01)
  *G06Q 10/06* (2012.01)

(52) U.S. Cl.
  CPC .............. *G06Q 10/107* (2013.01); *G06Q 10/06* (2013.01)

(58) Field of Classification Search
  CPC ....... G06Q 10/06; G06Q 10/107; H04L 51/18
  See application file for complete search history.

(56) References Cited

U.S. PATENT DOCUMENTS

| | | | | |
|---|---|---|---|---|
| 5,530,861 | A * | 6/1996 | Diamant et al. | 705/7.21 |
| 8,571,906 | B2 * | 10/2013 | Upadhyaya et al. | 705/7.11 |
| 2002/0078007 | A1 * | 6/2002 | Herrero | 707/1 |
| 2002/0124028 | A1 * | 9/2002 | Kroeger | 707/530 |
| 2003/0182379 | A1 * | 9/2003 | Henry | 709/206 |
| 2004/0103309 | A1 * | 5/2004 | Tracy et al. | 713/201 |
| 2005/0027803 | A1 * | 2/2005 | Kelley et al. | 709/206 |
| 2006/0106846 | A1 * | 5/2006 | Schulz et al. | 707/101 |
| 2006/0143613 | A1 * | 6/2006 | Lippe et al. | 718/100 |
| 2007/0186214 | A1 * | 8/2007 | Morgan | 718/100 |
| 2007/0226340 | A1 * | 9/2007 | Hastings et al. | 709/226 |
| 2007/0282660 | A1 * | 12/2007 | Forth | 705/9 |
| 2008/0243930 | A1 * | 10/2008 | Browning et al. | 707/104.1 |
| 2008/0301296 | A1 | 12/2008 | York | |
| 2009/0063242 | A1 | 3/2009 | Shaouy | |
| 2009/0198764 | A1 * | 8/2009 | Pham et al. | 709/202 |
| 2009/0216792 | A1 * | 8/2009 | Grebner et al. | 707/102 |
| 2010/0274620 | A1 * | 10/2010 | Upadhyaya et al. | 705/9 |

OTHER PUBLICATIONS

"VIP Quality Software, LTD", "VIP Team To Do List", http://www.vip-qualitysoft.com/products/team_to_do_list/, Copyrighted date: 2004-2009 pp. 1-2.
"VIP Quality Software, LTD", "VIP Team To Do List's Features", http://www.vip-qualitysoft.com/products/team_to_do_list/features/, Copyrighted Date: 2004-2009 pp. 1-3.
"ActionThis Limited", "ActionThis", http://www.actionthis.com/Info/ForYourTeam , Copyrighted Date: 2008, pp. 1-2.

(Continued)

*Primary Examiner* — Ranodhi Serrao
*Assistant Examiner* — Thomas Richardson
(74) *Attorney, Agent, or Firm* — Narendra Reddy Thappeta

(57) ABSTRACT

A mail server based approach to task management. In an embodiment, a first user sends a task assignment email indicating a task sought to be assigned, a list of assignees and a list of recipients. The mail server forwards the email message to all the recipients, while maintaining information of a current status of the task. The assignees may send status updates and the current status is accordingly updated. The status information on the server can be accessed by various users.

24 Claims, 11 Drawing Sheets

(56) References Cited

OTHER PUBLICATIONS

"AXSELLIT", "Task-Base", http://www.axsellit.com/task-manager.aspx, Copyrighted Date: 2006, pp. 1-2.

"GECAD Technologies", "Working With Your Tasks", http://www.axigen.com:80/docs/en/Working-with-your-Tasks_307.html, Copyrighted Date: 2005-2009; pp. 1-5.

SOFTALOT LLC", "Action Item Manager 5.0 Enterprise Edition", User's Guide—Version 5.02, Copyrighted Date: 2008, pp. 1-26.

"Microsoft Corporation", "Assign a To-Do Item in a Workflow", http://office.microsoft.com/en-us/sharepointdesigner/HA102336231033.aspx#3, Copyrighted Date: 2009, pp. 1-11.

"Horton & Adams", "Standard for Interchange of Usenet Messages", Network Working Group, RFC-1036, Publication Date: Dec. 1987, pp. 1-20.

"P. Resnick", "Internet Message Format", Network Working Group RFC-2822, Category: Standards Track, Publication Date: Apr. 2001, pp. 1-38.

"David H. Crocker", "Standard for the Format of ARPA Internet Text Messages", RFC-822 Publication Date: Aug. 13, 1982, pp. 1-38.

* cited by examiner

| | Event ID | Sub-Task ID | Status | Recipients | Assignees | Task Name | Last update |
|---|---|---|---|---|---|---|---|
| row 1 → | 11111 | N/A | Recipients Notified | DL1 | Any | Project 1 | 21 September, 2009 |
| row 2 → | 22222 | N/A | Complete | DL3 | Any | Project 3 | 22 September, 2009 |
| row 3 → | 33333 | N/A | 60% Complete | DL4 | Any | Project 4 | 22 September, 2009 |
| row 4 → | 44444 | 44444-A | 50% Complete | DL2 | xyz | Project 2 | 23 September, 2009 |
|  |  | 44444-B | Completed |  | abc |  | 23 September, 2009 |
| row 5 → | 55555 | 55555-A | Recipients Notified |  | Any |  | 29 September, 2009 |
|  |  | 55555-B | Recipients Notified | DL6 | User1 | Task-1 | 29 September, 2009 |
|  |  | 55555-C | Recipients Notified |  | User2 |  | 29 September, 2009 |
| row 6 → | 66666 | 66666-A | Recipients Notified |  | Any |  | 29 September, 2009 |
|  |  | 66666-B | Recipients Notified | DL6 | User3 | Task-2 | 29 September, 2009 |
|  |  | 66666-C | Recipients Notified |  | User4 |  | 29 September, 2009 |

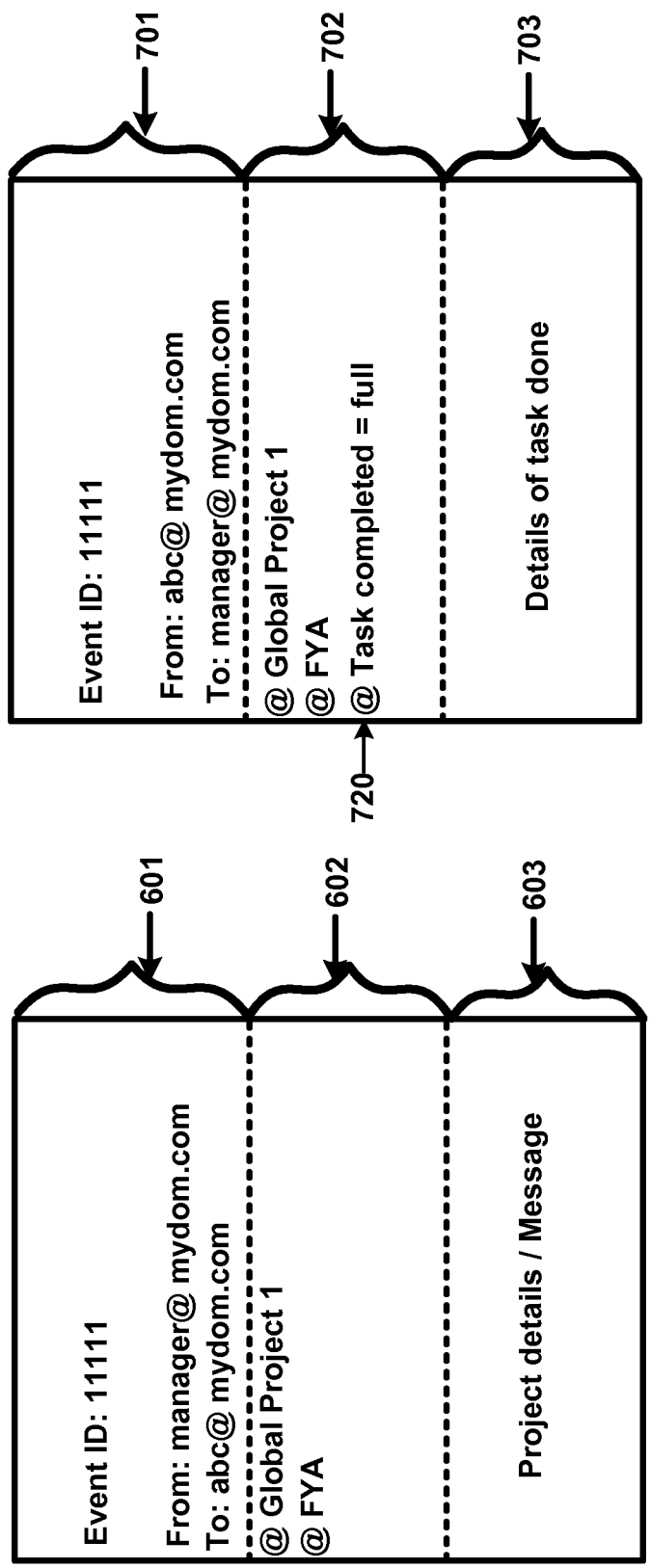

US 9,098,834 B2

TASK MANAGEMENT USING ELECTRONIC MAIL

BACKGROUND OF THE INVENTION

1. Technical Field

The present disclosure relates to computer based task management, and more specifically to task management using electronic mail.

2. Related Art

There are often scenarios in which the performance of a task(s) by one or more members assigned with corresponding responsibilities needs to be managed or coordinated. For example, a manager of a project may assign a task of a project to members of a team. The manager, as well as members of the team, may wish to monitor the status of the task from time to time during the lifetime of the project.

Electronic mail (Email), as is well known in the relevant arts, refers to messages that are directed to specific recipients, and mail servers are thereafter used to deliver the messages to corresponding specified recipients. Several aspects of the present invention enable convenient task management using electronic mail.

BRIEF DESCRIPTION OF THE DRAWINGS

Example embodiments of the present invention will be described with reference to the accompanying drawings briefly described below.

FIG. 4 is a table storing status of tasks and sub-tasks maintained by a server in an embodiment of the present invention.

FIG. 6 is a diagram illustrating the content of an example email forwarded by a server to task recipients in an embodiment of the present invention.

FIG. 7 is a diagram illustrating the content of an example response email generated by a client system in an embodiment of the present invention.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

A server system based approach to task management is provided according to an aspect of the present invention. In an embodiment, a first user ("assignor") sends a task assignment email message indicating a task sought to be assigned and a list of recipients. The server system forwards the email to all the recipients, while maintaining information of a current status of the task. The recipients may send status updates and the current status is accordingly updated. The recipients and the first user may access the status information on the server system.

According to another aspect of the present invention, an assignor can specify sub-tasks associated with a task in an email and the server system thereafter tracks the status of completion of each sub-task.

According to yet another aspect of the present invention, an assignor may specify specific recipient(s) responsible for each task and sub-task and the server system thereafter enables only such specific recipients to update the status of the corresponding task and sub-task.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
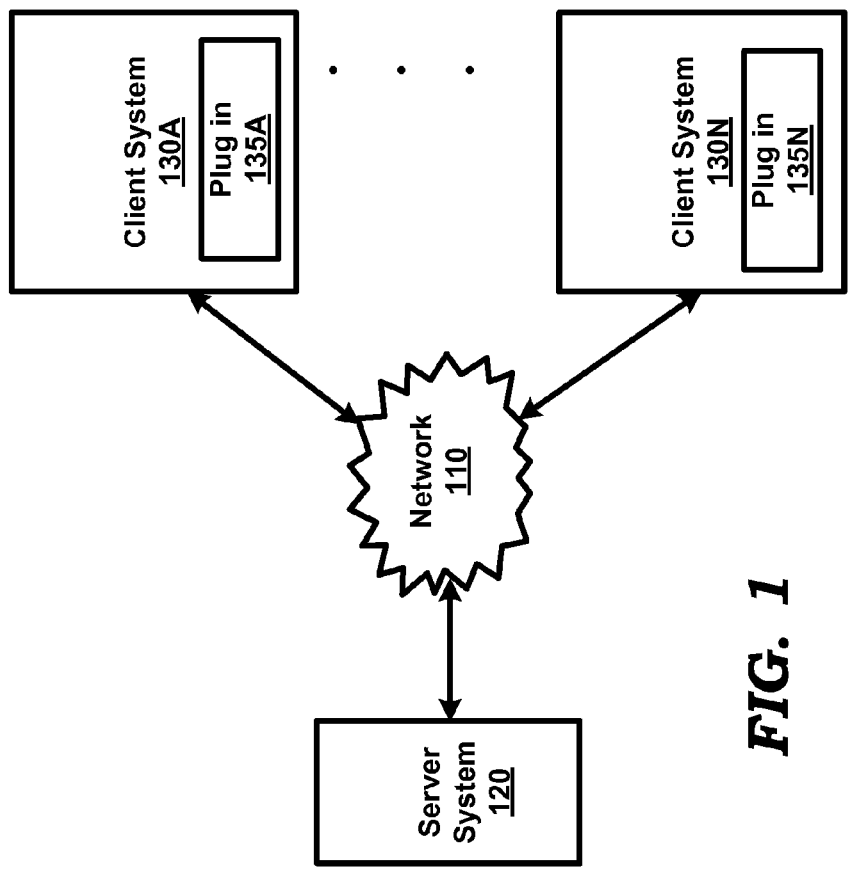
FIG. 1 is a block diagram illustrating an example environment in which several aspects of the present invention can be implemented.

FIG. 1 is a block diagram illustrating the details of an example environment (or computing system) in which several aspects of the present invention can be implemented. The computing system is shown containing network 110, server system 120, and client systems 130A-130N. Merely for illustration, only representative number/type of systems is shown in the Figure. Many environments often contain many more systems, both in number and type, depending on the purpose for which the environment is designed. Each component/block of FIG. 1 is described below in further detail.

Network 110 represents a network providing connectivity between server system 120 and client systems 130A-130N, and is assumed to include both a local area network as well as internet. Network 110 may be implemented using protocols such as Internet Protocol (IP) well known in the relevant arts. In general, in IP environments, an IP packet is used as a basic unit of transport, with the source address being set (in the originating system) to the IP address assigned to the source system from which the packet originates and the destination address set to the IP address of the target system to which the packet is to be eventually delivered.

Each of client systems 130A-130N represents a system such as a personal computer, workstation, mobile station, etc., from which a corresponding user may send or receive messages in the form of emails, including for the purpose of task management in accordance with several aspects of the present invention. Each client system is generally configured with a user identifier of a corresponding user, the incoming mail server (from which messages are to be downloaded) and an outgoing mail server (to be used to send messages). The outgoing mail server is assumed to be server system 120, which can also operate as an incoming mail server (from which client systems retrieve emails by appropriate email client software, such as Outlook Express from MICROSOFT CORPORATION).

In general, the users of client systems 130A-130N represent a collaborative team (assumed to contain a manager/assignor and one or more team members, for illustration) that communicate among themselves in the process of performing of a task(s). According to an aspect of the present invention, such communication is done via email (as described in detail below), and accordingly each of client systems 130A-130N contains at least an email client.

Each of client systems 130A-130N is also shown containing a corresponding plug-in software components 135A-135N. Each of plug-in 135A-135N may be implemented identically, and represents custom code/routines (executable modules) that are added to (or interfaced with) the code/routines of the corresponding client systems 130A-130N, to enhance the features provided by the client systems according to several aspects of the present invention. Plug-ins 135A-135N provide several features such as automatic insertion of tags and task/event ID in emails, as described with respect to examples below. The implementation of plug-ins 135A-135N will be apparent to one skilled in the relevant arts, by reading the disclosure provided herein.

Server system 120 facilitates task management according to several aspects of the present invention, in addition to forwarding emails received from client systems 130A-130N while operating as an incoming mail server. With respect to forwarding of emails, the mail header in a received email is examined to determine the specific target machine to send to (using technologies such as Domain Name Server or internal configured files), and forwards the emails. Some of the emails may specify an alias, for which server system 120 maintains the corresponding list of email identifiers (of corresponding recipients).

Server system 120 directs the received email to each of such email identifiers. Some of the servers (operating as outgoing mail servers) may store emails directed to a local user, and each local user may download emails from server system 120 (incoming mail server) using compatible client software. Thus, server system 120 may operate as both an incoming mail server and an outgoing mail server (from the perspective of client systems 130A-130N).

With respect to task management, server system 120 operates according to several aspects of the present invention to provide a convenient interface, as described below with examples.

3. Task Management at Server

Figure 2:
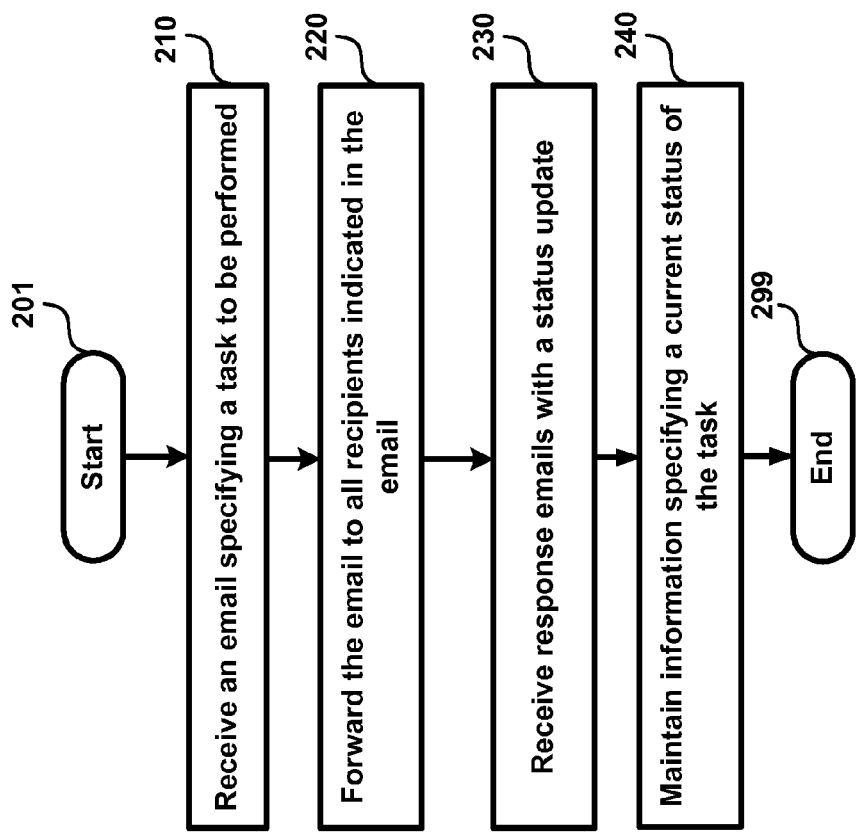
FIG. 2 is a flowchart illustrating the manner in which task management is performed using a (mail) server system, in an embodiment of the present invention.

FIG. 2 is a flowchart illustrating the manner in which a server performs task management, in an embodiment of the present invention. The flowchart is described with respect to FIG. 1, and in relation to server system 120 merely for illustration. However, the features can be implemented in other environments (and in other servers) also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, server system 120 receives an email specifying a task to be performed. The email may be received from a user (e.g., manager of a team) of a client system, with the email also specifying a list of recipients to whom notification of the task is to be provided. The list of recipients may be specified in a header portion of the email (e.g., in the "To:" field). As is well known in the relevant arts, each email message may be viewed as containing a header portion and a body portion. The body portion includes the specific content sought to be sent by the user, while the header portion includes various pieces of information (such as from, to, date stamps, route taken by the email, etc.) that is generally proposed by the protocol for proper/convenient operation of the mail system.

The list of recipients (in the To field) is termed as a distribution list, which can contain the individual email identifiers or an alias. The body portion of the email may contain a set of tags indicating that the email is associated with a task to be managed (also termed an action item email, to distinguish the email from other (plain) emails not associated with task management), as well as the details of the task to be performed. Alternatively, the tag can be placed in a header portion of the email (according to a suitable convention) as well. Control then passes to step 220.

In step 220, server system 120 forwards the email to all recipients indicated in the email. In case the distribution list is in the form of individual email identifiers, the email is forwarded to each of the recipient email addresses. To address situations in which the recipients are designated by an alias, server system 120 may maintain respective lists of recipients corresponding to the distribution lists (DLs). The "To:" field of the email received in step 210 may contain the DL identifier, and server system 120 may forward the email to each recipient of the DL. Control then passes to step 230.

In step 230, server system 120 receives response emails containing status updates for the assigned tasks. A status update indicates specific information on current situation on performance of the assigned task. The current situation includes information such as whether the status is complete or not, percentage level of completion of the task, placed on hold, awaiting some other external event, etc. The response emails are received from users (e.g., a team member) at another client system who previously (step 220) received the email forwarded by server system 120.

In step 240, server system 120 maintains information specifying a current status of the task. The task status maintained by server system 120 may be 'viewed' by a manager and the members associated with the task by logging into server. Due to such centralized maintenance of the status information, task management may be substantially simplified. Control then passes to step 299, in which the flowchart ends.

While maintaining of task status information by server system 120 is described above as being performed separately in step 240, in general, server system 120 may initiate task maintenance activities upon receipt of the email in step 210 itself. Then, upon receipt of a response email, server system 120 may update the task status. The features noted above are illustrated below with examples. However, the internal details of server system 120 in an embodiment of the present invention are provided first.

4. Server System

Figure 3:
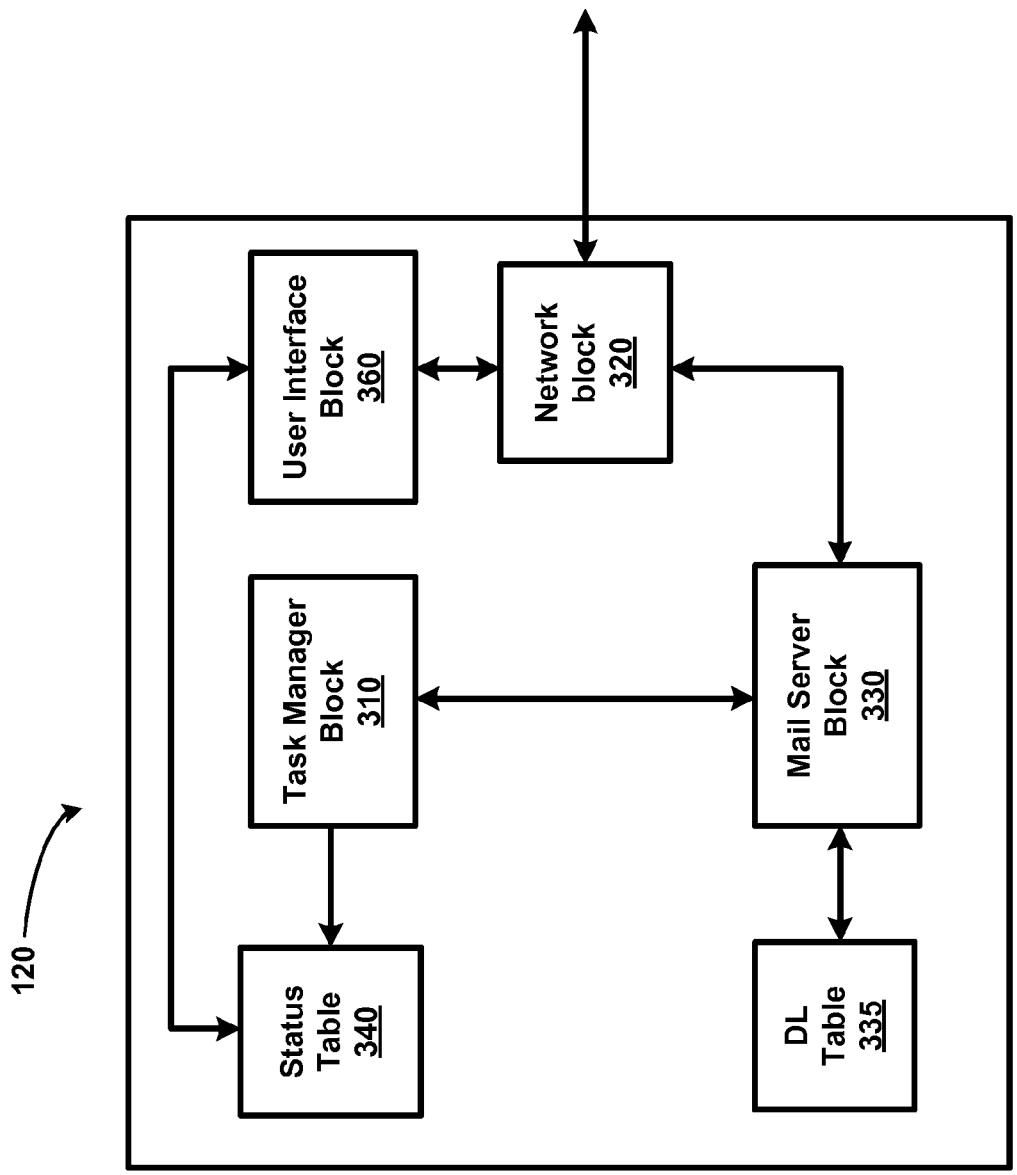
FIG. 3 is a block diagram illustrating the internal blocks of a server system in an embodiment of the present invention.

FIG. 3 is a block diagram illustrating the internal blocks of a server system in an embodiment of the present invention. Server system 120 is shown containing task manager block 310, network block 320, mail server block 330, DL table 335, status table 340 and user interface block 360. Various other components/blocks typically contained in a server are not shown in the Figure as being not relevant for an understanding of several aspects of the present invention. Each block of FIG. 3 is described below in detail.

Network block 320 provides various communication routines/utilities (e.g., network protocol stacks, etc.) to enable communication with a network (e.g., network 110 of FIG. 1), and thus with other systems connected to the network. In an embodiment described below, network block 320 operates in conjunction with network interface 1280 (of FIG. 12) to provide communication with external systems. DL table 335 contains the distribution lists (i.e., mapping of each valid distribution list to corresponding email addresses), stored in hardware such as volatile or non-volatile memories.

Mail server block 330 sends and receives emails (in conjunction with network block 320) to and from client systems 130A-130N (shown in FIG. 1). Mail server block 330 processes incoming emails (directed to server system 120, as may be indicated by a destination IP address in emails being the same as the IP address of server system 120) to determine if the emails are associated with task management (as against other plain emails not associated with task management).

In an embodiment, mail server block 330 checks for the presence of tags (illustrated with examples below) that specify that an email (action item email) is associated with a task. Upon determination that an email is an action item email, mail server block 330 forwards the header portion as well as the contents (the body portion) of the email to task manager block 310 for further processing. Mail server block 330 forwards a received action item email (after inclusion of the task or sub-task identifier) to all recipients specified by a distribution list (DL) or alias (in the To: field of the received action item email).

Task manager block 310 determines the status of various tasks based on the relevant (header/message) portions of corresponding action item emails (forwarded by mail server block 330, as noted above). Upon receipt of a new action item email, task manager block 310 generates a task/event ID associated with the action item email (and other action item emails associated with the same task) and stores an entry corresponding to the action item in status table 340. Task manager block 310 then updates the status of the tasks (as identified by the corresponding unique identifier in the emails) in status table 340 when emails related to the action item are received thereafter.

Status table 340 stores the current status of each assigned task. In an embodiment shown in FIG. 4, status table 340 is shown containing seven columns, with the first column containing the unique identifier of a task (the task or event ID), the second column indicating the unique identifiers of sub-tasks of the task whose task ID is listed in column one, the third column indicating the 'current' status of a task and corresponding sub-tasks (if any), the fourth column indicating the recipients to be notified, the fifth column indicating the assignees, the sixth column indicating the task name, and the seventh column indicating the last time the status of the task was updated. The details and entries of status table 340 are shown merely by way of example, and task manager 310 can also create status tables with more or fewer entries. For example, the initiator/assignor of a task (e.g., 'manager' in the example of FIG. 5A described below) may be stored as one of the entries (rows) corresponding to a task ID.

Row 1 specifies that a task named 'Project 1' with event ID (also be termed task ID) 11111 has been notified to recipients identified by distribution list DL1, and that the last status update was on 21 Sep. 2009. Row 2 specifies that a task named 'Project 3' with event ID 22222 notified to recipients in distribution list DL3 has been completed, and that the last status update was on 22 Sep. 2009. Row 3 specifies that a task named 'Project 4' with event ID 33333 notified to recipients in distribution list DL4 is 60% complete, and that the last status update was on 22 Sep. 2009.

Tasks listed in rows 1, 2 and 3, not being assigned to any specific users, do not contain sub-tasks, and the corresponding entries in the Sub-Task ID field is N/A. Row 4 specifies that the status of (respective portions of the) task named 'Project 2' has been assigned an event ID 44444, and is further split into sub-tasks identified uniquely by sub-task identifiers 44444-A and 44444-B, each respectively assigned to users 'xyz' and 'abc' (and notified to DL2). The statuses of the subtasks are noted as respectively being 'incomplete' and 'complete', and that the last status update was on 23 Sep. 2009.

Continuing with respect to FIG. 3, Task manager block 310 inserts an 'event ID' (or task ID) identifier uniquely identifying the task (and to facilitate identification of other emails associated with the task, as noted below) into either a header portion (header field) or the body of the forwarded action item emails. The event ID can be included using various fields such as Message ID field according to section 3.6.4 of RFC 2822 (Internet Message Format), Keywords field according to section 3.6.5 of RFC 2822, User-defined field according to section 4.7.5 of RFC 822, and Keywords field according to section 2.2.9 of RFC 1036.

Task manager block 310 forwards new action item email message, with the event identifier inserted, to mail server block 330 for forwarding to all intended recipients. Alternatively, task manager block 310 may simply assign a task identifier and provide the task identifier to mail server block 330. In such a case, mail server block 330 inserts the task identifier into the email before forwarding it to the intended recipients.

While the event ID is noted above as uniquely identifying the task, in other embodiments the combination of event ID and the distribution list (either the alias or the first email in a list of individual recipients, noted above) serves to uniquely identify the task. In general, as the number of tasks that need to be managed becomes large in number, the combination of event ID and DL may be used as the unique task identifier.

Task manager block 310 determines the status of various tasks based on the body portions of corresponding reply emails. Before updating the status column, task manager block 310 may ensure that the reply email is from (based on From field in the header) an assignee indicated in the corresponding column/row. Task manager block 310 maintains and updates the status of the tasks (as identified by the corresponding unique identifier in the emails) in status table 340, an embodiment of which is shown in more detail in FIG. 4.

User interface block 360 enables users to access the information in status table 340 (e.g., by means of a dashboard type user interface). A user may be authenticated (e.g., as one of the members of the DL for information related to a task assigned to the DL) before being permitted to access the information in the status table. It should be appreciated that the task assignor (manager) as well as any of the task recipients may conveniently view current status information (updated by any/all of the recipients) from a central server, and the task management in organizations is accordingly simplified.

It should be thus appreciated that task manager block 310 updates status table 340 based on email communications received from various recipients of task assignment email. Example email communications between the server system 120 and client systems 130A-130N of FIG. 1 involved in the management of a task are illustrated next with respect to corresponding Figures.

5. Electronic Mail Format

Figure 5A:
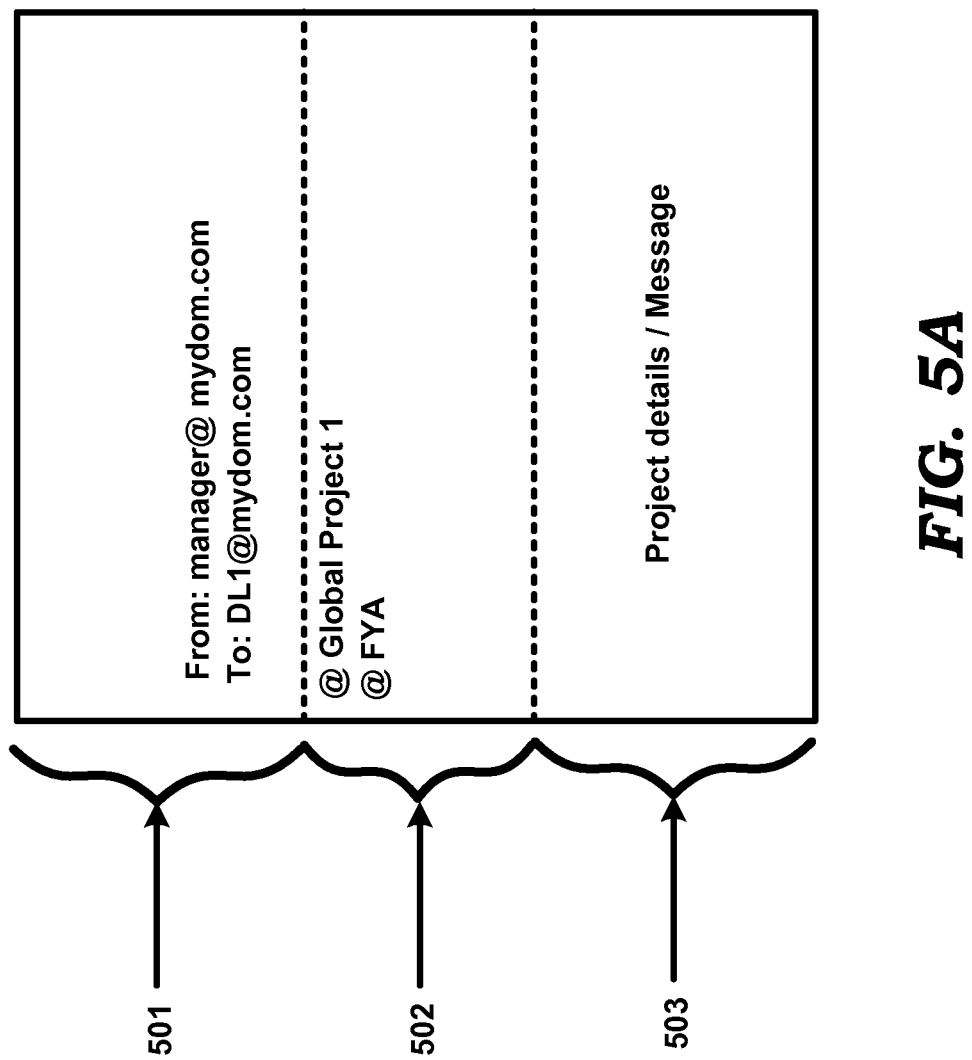
FIG. 5A is a diagram illustrating the content of an example email generated by a client system to assign a task in an embodiment of the present invention.

FIG. 5A is a diagram depicting the format of an example email formed/generated by a user (e.g., a manager of a team) of a client system (and sent to server system 120) to assign a task to the corresponding recipients. The email is shown containing portions (or sections) 501, 502 and 503. Portion 501 corresponds to the header portion of an email, and may contain related header fields and corresponding entries according to a predefined convention (e.g., based on the corresponding email standard or protocol). In particular, the "To:" field specifies either the individual email addresses of the assignees of the task or an alias as a distribution list (DL). The distribution list in FIG. 5A is shown as "DL1". The "From:" field is also shown in the Figure.

Portion 503 constitutes the body portion (user specified content) of the email, and can be used by a manager to indicate the details of the task that to be performed. The details may include simple text identifying the tasks and any instructions the manager may wish to provide to the assignees of the respective tasks. Portion 502 ('tag portion') contains tags, one or more of which identify the email as being an action item email (and any other information for task assignment).

In FIG. 5A, the tag "@Global" (which may be inserted, for example, by the plug-in in the corresponding client system in which the email is created) specifies that the task is "for the attention" of all of the members contained in distribution list (i.e., DL1, in the example), without specifically indicating which of the members is to perform the task (Project 1). Thus, any of the recipients may perform the task. The name of the associated task is indicated in the Figure as "Project 1". More details such as sub-tasks/phases/revisions etc., of a task may also be specified in the "@Global" tag line, but not shown.

Further, the task name (Project 1) and the project name (which may also be Project 1) are noted as being the same merely for simplicity. However, the email may specify specific task names as well. Since, user-specific tasks are not indicated in the email, task "Project 1" is a 'global' task (meaning that any one or more recipients in DL1 may perform the task), and the @Global tag is optional, and only the task name (Project 1 in the example of FIG. 5A) may be entered.

The "@FYA" tag identifies the email as being an action item email. The plug-in of the corresponding client system in which the email is created, inserts the @FYA tag. As noted above, the @Global and @FYA tags can be placed in a header field of the email, or in the body (e.g., first line) of the email according to a suitable convention.

While portion 502 is shown in FIG. 5A as separate from header portion 501 and body portion 503, portion 502 may be contained in either header portion 501 or body portion 503, for compatibility with the mail protocols. In an embodiment, portion 502 is contained in body portion 503 to reduce the changes to the plug-in software. The specific tags noted above are merely by way of examples, and other conventions/tags for specifying the details noted above may be used instead.

The email of FIG. 5A is sent/routed to server system 120, and row 1 of FIG. 4 is shown for that task assignment. The email with event id 11111 inserted, is sent to the recipients corresponding to DL1 @mydom.com.

The message of above can be formed using various approaches. In an embodiment, the plug-in in each client system is designed to automatically insert tags and task/event ID in emails. An example illustrating a user-level "view" when creating an action item email is provided next.

6. Client System User Experience

Figure 5B:
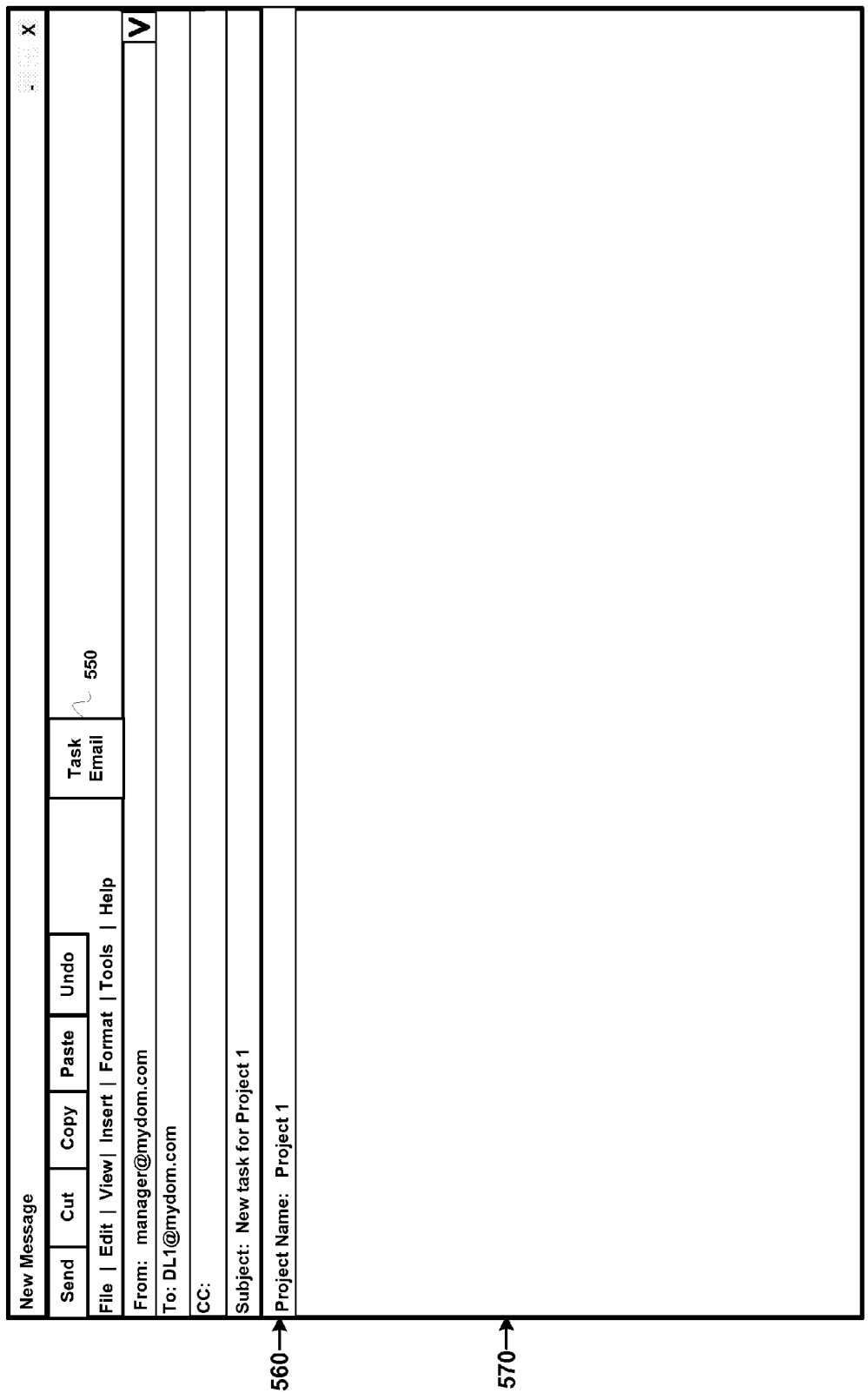
FIG. 5B is a view of a screen depicting an action item email created in an embodiment of the present invention.

FIG. 5B is a view of a screen depicting an action item email (new action item email) created in an embodiment of the present invention. The email may be created, for example, by a manager of a team specifying the task to be performed in relation to a project. The template of the email containing various fields, icons/buttons, etc., as shown in the Figure corresponds to the template created by commonly available email clients (e.g., Outlook Express™ available from MICROSOFT CORPORATION), and hence not described in detail.

In an embodiment, the plug-in in the client system in which the email depicted in FIG. 5B is created, automatically causes the display/generation of the "Task Email" button 550. When the manager clicks on button 550, the user is provided a field 560 to enter a desired text for project name. When the user clicks on 'Send', the entered name is provided as a parameter to tag @Global (as shown in FIG. 5A), and the tag @FYA is also inserted. Area 570 represents the portion (content portion) where the manager enters text specifying the details of the task to be performed. Once the user presses the 'send' button, the message of FIG. 5A is formed and sent to server system 120.

The description is continued with example illustrations of email exchanges between server system 120 and corresponding client systems in managing a task.

7. Emails

Upon receipt of the email of FIG. 5A, and as noted above, server system 120 (specifically task manager block 310 contained within) determines that the email is associated with a task, based on the tag @FYA in portion 502. In response, task manager block 310 updates status table 340 to add a corresponding entry/row, and forwards the received email to each of the recipients in list DL1. An example email destined to a user 'abc' (deemed included in list DL1) is shown in FIG. 6. The email is shown containing event ID "11111" (generated by task manager block 310) and the email address (abc@mydom.com) of the recipient in header portion 601. Task manager block 310 may set the status of the task (for the corresponding entry) as "assigned", as shown in FIG. 4.

Portion 602 contains the tags @Global (optionally, as noted above) and @FYA, with the task name (Project 1) listed beside the @Global tag. Body portion 603 contains the same project details as received from the manager and as shown in the email of FIG. 5A. Server system 120 sends similar emails as that of FIG. 6 to each of the other recipients in the list DL1.

User 'abc', upon receipt of the email of FIG. 6, performs corresponding actions (whether completing partially/fully the task indicated in the email received, or no action yet taken related to the assigned task), and then sends to server system 120 a response email as shown in FIG. 7. The email of FIG. 7 is shown containing event ID "11111" in header portion 701. As noted above, the plug-in in the client system of user 'abc' automatically inserts the event ID "11111" in the header portion (e.g., in any of the fields noted above with respect to mail server block 330).

Portion 702 contains the tags @FYA, @Global (again optional), the task name 'Project 1', as well as the status of the task beside the @Task tag. In FIG. 7, the status is noted (beside the @Task tag) as completed, as specified by the string "completed=full". Partially completed tasks may be specified in a similar manner. For example, assuming the task is only 10% complete, the status would be specified by a string "completed=10%" beside the @Task tag. Body portion 703 may contain the specific details related to the task that have performed/not performed.

On receipt of the email of FIG. 7, mail server block 330 determines from the @FYA tag that the email is an action-item related mail, and forwards the email to task manager block 310. Task manager block 310 determines that the email is associated with event ID 11111, and updates the status of the task with event ID 11111 as 'task done' or 'completed' in status table 340 (updated status not indicated in FIG. 4). As the assignee column indicates 'Any', no further authentication is required before the update is performed. Task manager block 310 may further confirm that the email of FIG. 7 is a 'reply' email by examining the 'reply-to' header field, which would be non-blank (having the message id of the email to which a reply was generated).

Alternatively or in addition, the identifiers of the threads of emails in the "References" header field may also be used to determine that the reply is related to a specific task assignment. In such a case, the message identifiers (not shown) used in the References field may be stored in the status table of FIG. 4, for later correlation with replies.

Although task manager block 310 may note the task as being complete in response to receipt of the response email from user 'abc', another user in DL1 can specify more actions to be performed with respect to the task 'Project 1". In such a scenario, the 'second' user sends a response email with a suitable tag (such as, for example, @reopen) in the email body, with corresponding details specifying what else needs to be done for the task. Task manager block 310 then sets the status of the task (i.e., with event ID 11111) as 'not complete'. The status of the task may get further modified as the task progresses and corresponding response emails are received from members in the DL list DL1.

According to an aspect, when a user attempts to operate on a task already closed, the plug-in component in the users client system synchronizes with task manager block 310 (i.e., retrieves and inspects the entry corresponding to the event id), and concludes that the reply is being made in reference to a event ID that is associated with a task that task manager block 310 has already flagged as "completed". The plug-in accordingly generates a pop-up window on the client system's display screen, with text requesting for the user's confirmation if the task needs to be reopened or not. Such a feature may be specifically convenient when a user wishes to reply with generic comments, but without seeking to "re-open" the task.

According to another aspect of the present invention, a task email can be targeted for action by specific users, as described next.

8. Assigning Sub-Tasks to Specific Users

Figure 8:
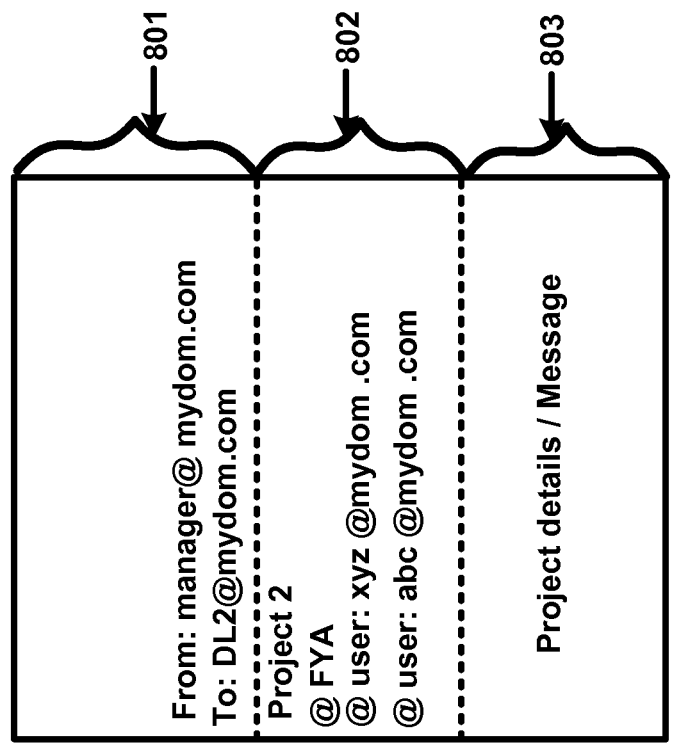
FIG. 8 is a diagram illustrating the content of another example email generated by a client system to assign tasks, in an embodiment of the present invention.

FIG. 8 shows an email that a manager composes (using plug-in 135A in client system 130A) to assign sub-tasks within a task to specific persons. For example, assuming that a project is to code and test a specific issue at hand, a manager may request one employee to develop the code, another employee to develop a test plan and a third employee to test the developed code. These three are said to be sub-tasks of a single task of addressing the issue at hand.

The email of FIG. 8 is shown addressed to distribution list DL2 in header portion 801. Portion 802 contains besides task name "Project 2" and the tag @FYA, additional tags "@user: xyz@mydom.com" and "@user:abc@mydom.com". The tags "@user:xyz@mydom.com" and "@user: abc@mydom.com" respectively indicate that the sub-tasks (detail provided later in the body portion) of Project 2 is to be performed by recipients 'xyz' and 'abc' respectively. Portion 803 may specify the corresponding activities related to the sub-tasks that need to be performed by recipients 'xyz' and 'abc' respectively. It should be appreciated that, according to this convention, the persons specified in each line are the assignees of the corresponding sub-task, and thus more than one assignee for a sub-task can be assigned by including multiple assignees in a single line. Thus, sub-tasks are deemed to be present only when there are multiple lines with assignees listed. If there is only a single line of assignees, it is assumed that the entire list of people is assigned the entire project/task (i.e., no sub-tasks). However, alternative conventions may employ more detailed conventions to specify sub-tasks.

On receipt of the email of FIG. 8, server system 120 operates in a substantially similar manner to that described above with respect to receipt of the email of FIG. 5A. However, in addition to creating a task ID for task "Project 2", task manager block 310 also creates identifiers (sub-task IDs) for the sub-tasks assigned specifically to each of the individual assignees. In FIG. 4, sub-task for user 'xyz' is shown assigned a sub-task ID of 44444-A, and sub-task for user 'abc' is shown assigned a sub-task ID of 44444-B.

Task manager block 310 stores the task details (task ID, sub-task IDs, DL, etc.) in status table 340. In an alternative embodiment, task manager block 310 stores the details of the sub-tasks in a separate table (different from status table 340). Example entries made by task manager block 310 for a task with sub-tasks assigned to specific individuals are shown in row 4 of status table 340 of FIG. 4. Task manager block 310 inserts the task ID and sub-task ID to the corresponding emails sent to users xyz and abc, and forwards the emails to mail server block 330, which in turn sends the emails to the corresponding users.

Figure 9B:
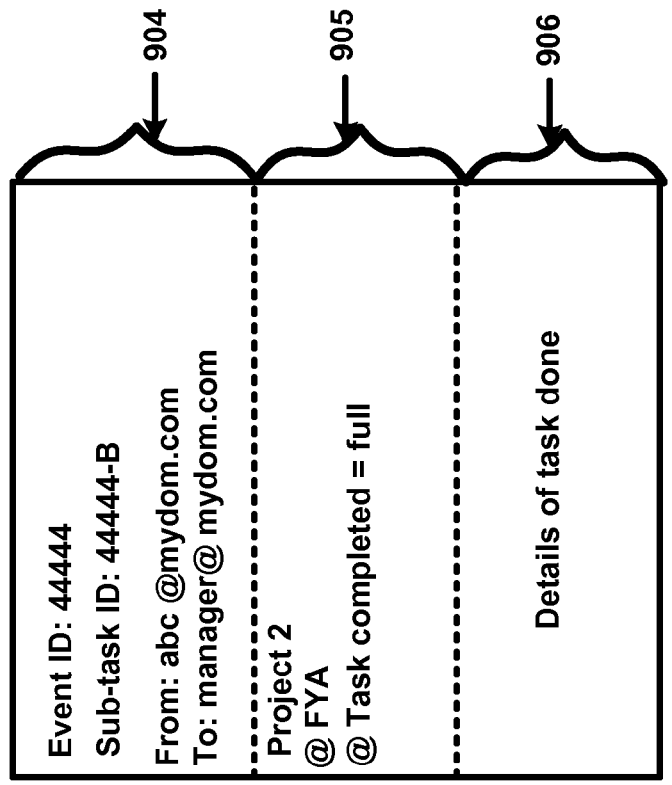
FIG. 9B is a diagram of yet another example response email generated by a client system in an embodiment of the present invention.
Figure 9A:
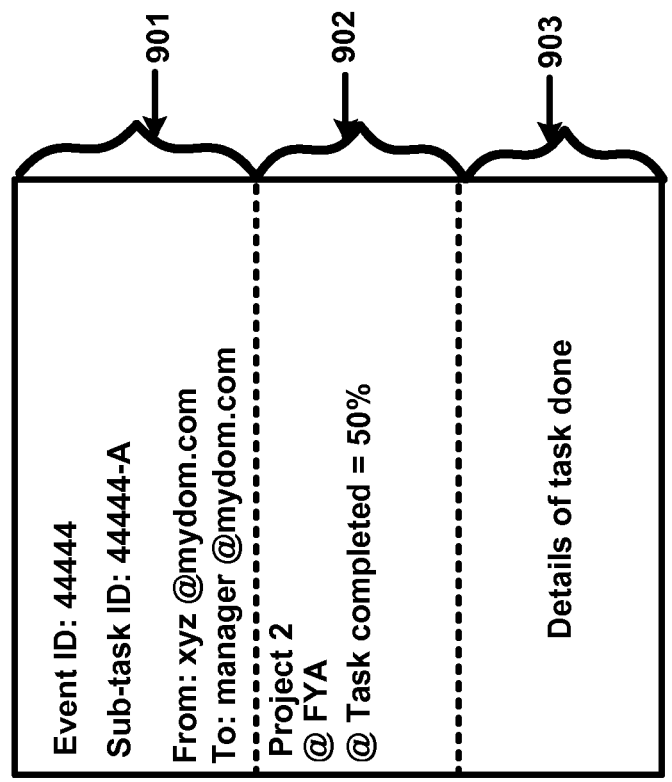
FIG. 9A is a diagram illustrating the content of another example response email generated by a client system in an embodiment of the present invention.

FIGS. 9A and 9B respectively show the content of response emails (composed using the client plug-ins) sent to server system 120 by users 'xyz' and 'abc', indicating respectively that the assigned sub-tasks are '50% complete' and 'complete'. It may also be noted that the response emails contain both the task ID (Event ID) as well as the respective sub-task ID. Portions 901, 902 and 903 of FIG. 9A and portions 904, 905 and 906 of FIG. 9B respectively represent the header portion, 'tag portion', and content/message/body portion of the corresponding emails. Event ID '44444' and sub-event ID (44444-A) in the email of FIG. 9A, and Event ID '44444' and sub-event ID (44444-B) in the email of FIG. 9B, shown in the header portions of the respective emails are inserted in a manner similar to that described above by appropriate operation of the plug-in). For example, the plug-in may prompt the user to specify the sub-event ID, if the assignment email indicates that the user is assigned more than one sub-task in the same assignment email.

In response to receipt of each of the emails of FIGS. 9A and 9B, mail server block 330 determines from the @FYA tag that the email is an action-item related mail, and forwards the email to task manager block 310.

Task manager block 310 determines that each of the emails of FIGS. 9A and 9B has a task ID 44444, and respective sub-task IDs 44444-A and 44444-B. The From field is used (by comparing with the assignee in the row with the matching event ID) to confirm that the respective senders are authorized to change the status of the corresponding entries. Task manager block 310 updates the status of each of the sub-tasks based on the entry beside the @Task field in the emails. Thus, task manager block 310 updates the status of sub-task with sub-task ID 44444-A as "50% complete", and the status of sub-task with sub-task ID 44444-B as "completed", as shown in FIG. 4.

Authenticated users may access status table 340 (via user interface block 360) and determine the status of tasks and sub-tasks. A user (e.g., in DL2) can specify more actions to be performed with respect to the task 'Project 2', for example related to 'completed' sub-task 44444-B. In such a scenario, the user sends an email with a suitable tag (such as, for example, @reopen) in the email body, with corresponding details specifying what else needs to be done for sub-task 44444-B. Task manager block 310 then sets the status of the sub-task 44444-B as 'not complete'. The status of the sub-tasks may get further modified as the task progresses and corresponding response emails are received from users.

Again, as also noted above, when a user attempts to operate on a task already closed, the plug-in in the user's client system synchronizes with task manager block 310 and generates a pop-up window on the client system's display screen, with text requesting for the user's confirmation if the task needs to be reopened or not.

Figure 10:
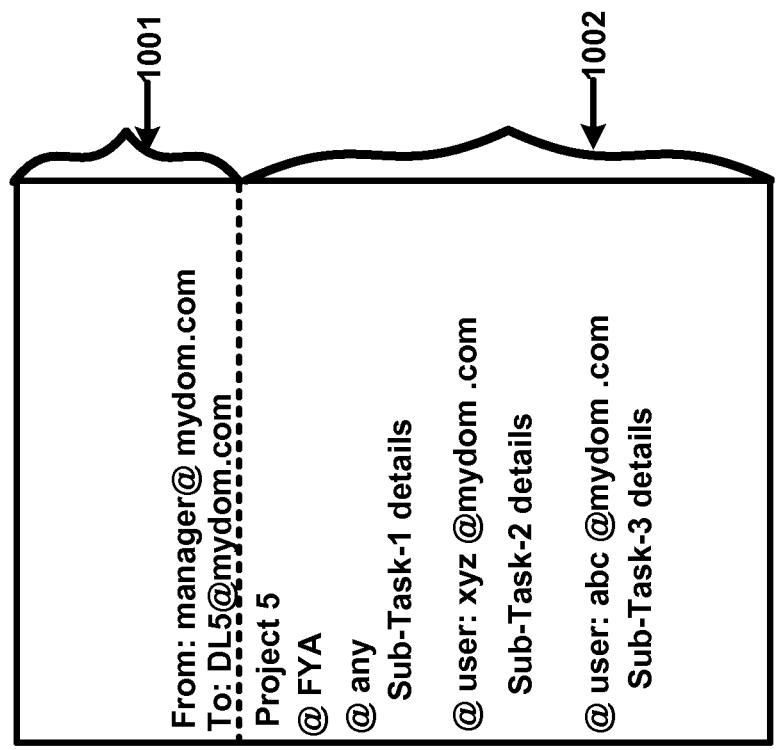
FIG. 10 is a diagram of yet another example email generated by a client system to assign tasks and sub-tasks in an embodiment of the present invention.

In another embodiment, a task email can be created to assign some tasks and/or sub-tasks to specific users, but other tasks and/or sub-tasks not assigned to specific users but where any one or more user(s) in the DL is allowed to perform the task/sub-task. An example email created for such task assignment is shown in FIG. 10. Portion 1001 of the email of FIG. 10 represents the header portion, while portion 1002 may represent a 'tag portion' and/or a body portion. Project 5 in the body portion specifies the task name. The @any tag specifies that any user in DL5 (specified in header portion 1001) can perform the corresponding sub-task (as specified by sub-task-1 details provided under the @any tag). It is noted that the @any tag is equivalent to the @Global tag noted with respect to FIG. 5A. However, users 'xyz' and 'abc' are specifically assigned the sub tasks (sub-task-2 and sub-task-3 respectively) noted under the respective sub-task assignments indicated by @user:xyz@mydom.com and @user:abc@mydom.com.

The mechanism of operation of server system 120 and client systems in handling emails of the type shown in FIG. 10 is similar to that described above, and the description is not repeated here in the interest of conciseness. However, it is noted that a response email from a user (in DL5) who receives the email of FIG. 10 may need to indicate which task the user has worked on. For example, user 'abc' may, in addition to performing sub-task-3, may also perform sub-task-1. Hence, when user 'abc' replies, the response email may need to indicate which sub-task the reply is associated with. Thus, the plug-in needs to be designed to ensure that the sub-task identifier to which the response is being sent, is identified in the response.

In an embodiment, if a task initiator/assignor (e.g., a manager) wishes that the status of a task assigned to multiple users continue to be maintained (and not be removed once an assigned user indicates that the task is completed) in server system 120, the following syntax of is used:

@user: user1, user2
Task Details

When tasks are specified as above, task manager block 310 continues to maintain details of the task till both the users (user1 and user2) have replied with "completed" status. Thus, even if user 1 has responded with an email specifying the task has been completed, task manager block 310 waits till user2 has also responded with an email specifying that the task has been completed, before deleting the task details from status block 340.

Figure 11:
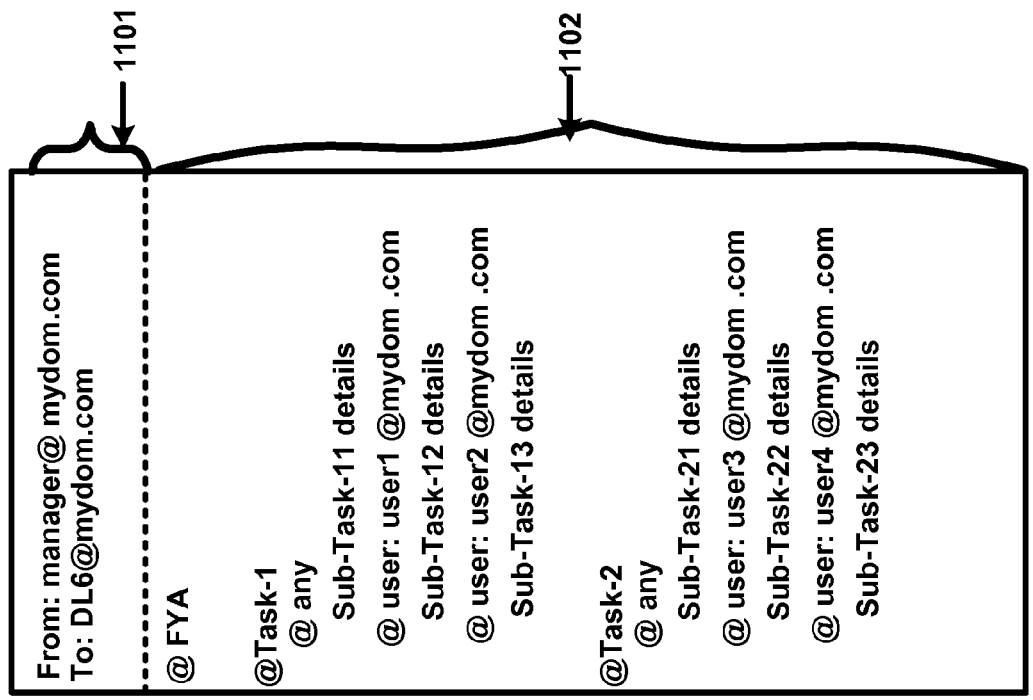
FIG. 11 is a diagram of yet another example email generated by a client system to assign multiple tasks and sub-tasks in an embodiment of the present invention.

In another embodiment, a (single) task email can specify multiple tasks as well as subtasks, as illustrated in FIG. 11. Portion 1101 of the email of FIG. 11 represents the header portion, while portion 1102 may represent a 'tag portion' and/or a body portion. The email of FIG. 11 specifies two tasks Task-1 and Task-2 that need to be performed. Any user in DL6 may perform sub-task-11 of Task-1. User1 is to perform sub-task-12 of Task-1, while user2 is to perform sub-task-13 of Task-1. Similarly, with respect to Task-2, any user in DL6 may perform sub-task-21 of Task-2. User3 is to perform sub-task-22 of Task-2, while user4 is to perform sub-task-23 of Task-2. Task manager block 310, on receiving the email of FIG. 11, creates status entries (shown as "recipients notified" in FIG. 4) in status table 340, as shown in rows 5 and 6. It is assumed that Task-1 is allotted a task ID of 55555, with sub-task-11, sub-task-12, and sub-task-13 are allotted sub-task IDs 55555-A, 55555-B and 55555-C respectively. Sub-task-11, sub-task-12, and sub-task-13 are shown respectively assigned to users 'any' (anyone in DL6 may perform the task), user1 and user2. Task-2 is allotted a task ID of 66666, with sub-task-21, sub-task-22, and sub-task-23 are allotted sub-task IDs 66666-A, 66666-B and 66666-C respectively. Sub-task-21, sub-task-22, and sub-task-23 are shown assigned respectively to users 'any' (anyone in DL6 may perform the task), user3 and user4. The task/sub-task status are shown as having been updated last on 29 Sep. 2009.

In an embodiment, server system 120 is implemented to provide error-handling features, such as handling typographical errors in email addresses in a "To:" field of an action item email. In such scenarios, server system 120 (or task manager 310) may be designed not to create a new task entry (or update an existing entry) task management flow, but instead send an email back to the corresponding user notifying the user of the error. Alternatively, server system 120 may be designed to create a task ID, but mark the task as 'unassigned', and send an email to the user notifying the user of the error. Server system 120 may later correct or update the 'unassigned' status on receiving corrections address from the user.

In an embodiment, the plug-in in a client system is designed to determine valid email IDs and/or DLs by communicating with server 120, and to provide in a pop-up window the valid IDs only. The user may then select the desired IDs by clicking on the corresponding text in the pop-up, thereby minimizing errors.

Server system 120 (as well as client systems 130A-130N) of FIG. 1 can be implemented in various embodiments as a desired combination of one or more of hardware, executable modules, and firmware. The description is continued with respect to an embodiment in which various features are operative when the software instructions described above are executed.

9. Digital Processing System

Figure 12:
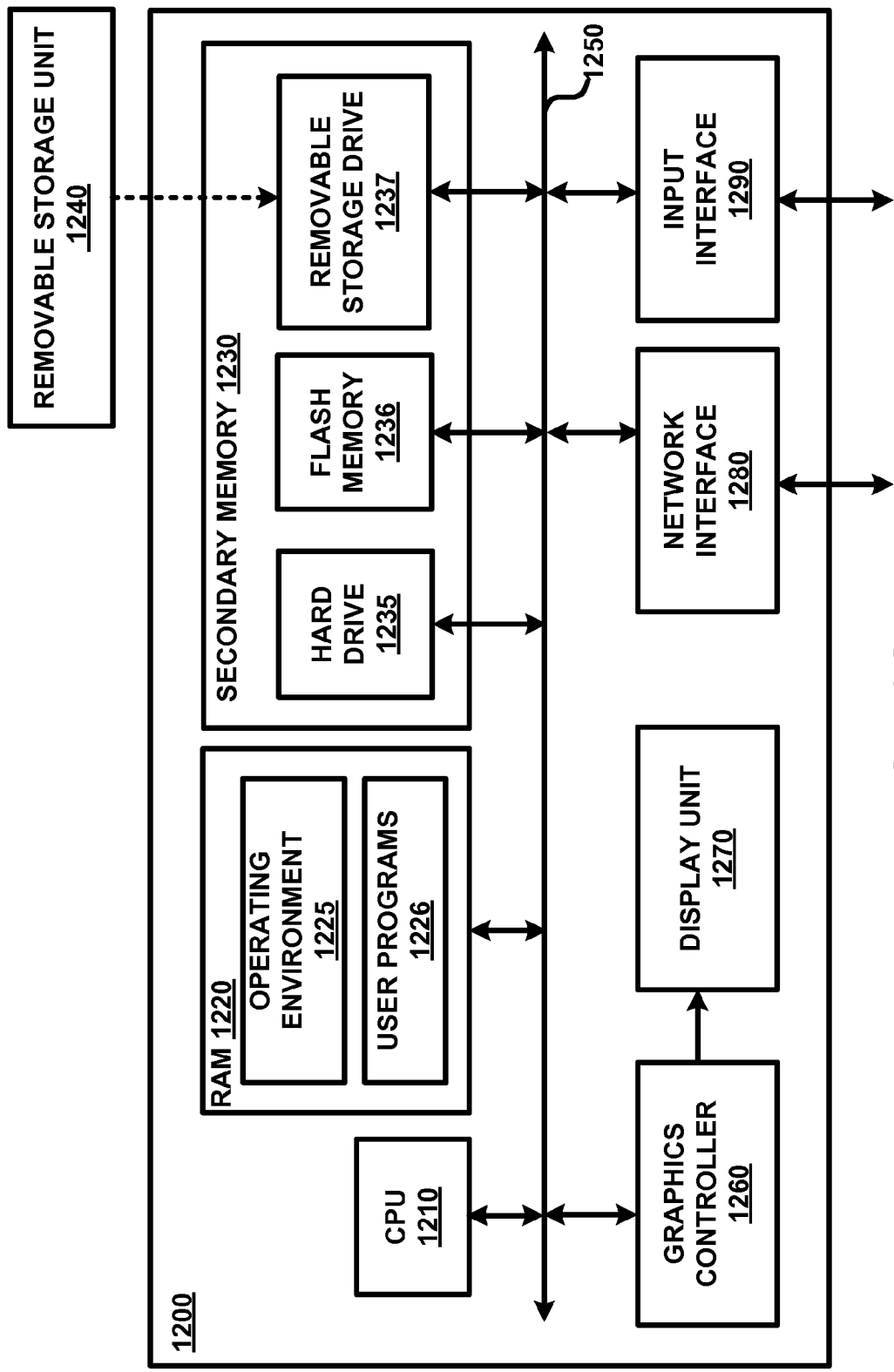
FIG. 12 is a block diagram illustrating the details of a digital processing system in which several aspects of the present invention are operative by execution of appropriate software instructions.

FIG. 12 is a block diagram illustrating the details of digital processing system 1200 in which various aspects of the present invention are operative by execution of appropriate execution modules. Digital processing system 1200 may correspond to each of server system 120, as well as client systems 130A-130N.

Digital processing system 1200 may contain one or more processors such as a central processing unit (CPU) 1210, random access memory (RAM) 1220, secondary memory 1230, graphics controller 1260, display unit 1270, network interface 1280, and input interface 1290. All the components except display unit 1270 may communicate with each other over communication path 1250, which may contain several buses as is well known in the relevant arts. The components of FIG. 12 are described below in further detail.

CPU 1210 may execute instructions stored in RAM 1220 to provide several features of the present invention. The instructions may include those contained in the various modules (shown in FIG. 3) of server system 120. When digital processing system 1200 is implemented to provide the features of client systems 130A-130N, the instructions may be designed to provide the features of plug-ins 135A-135N of FIG. 1. CPU 1210 may contain multiple processing units, with each processing unit potentially being designed for a specific task. Alternatively, CPU 1210 may contain only a single general-purpose processing unit.

RAM 1220 may receive instructions from secondary memory 1230 using communication path 1250. RAM 1220 is shown currently containing software instructions constituting operating environment 1225 and/or user programs 1226 (such as mail server block 330 and task manager block 310 of FIG. 3). The operating environment contains utilities shared by user programs, and such shared utilities include operating system, device drivers, virtual machines, etc., which provide a (common) run time environment for execution of user programs/applications.

Graphics controller 1260 generates display signals (e.g., in RGB format) to display unit 1270 based on data/instructions received from CPU 1210. Display unit 1270 contains a display screen to display the images defined by the display signals. Input interface 1290 may correspond to a keyboard and a pointing device (e.g., touch-pad, mouse), and may be used to provide inputs. Network interface 1280 provides connectivity (by appropriate physical, electrical, and other protocol interfaces) to network 110, and may be used to communicate with other systems connected to the network (for example, those shown in FIG. 1).

Secondary memory 1230 may contain hard drive 1235, flash memory 1236, and removable storage drive 1237. Secondary memory 1230 may store data and software instructions, which enable digital processing system 1200 to provide several features in accordance with the present invention.

Some or all of the data and instructions may be provided on removable storage unit 1240, and the data and instructions may be read and provided by removable storage drive 1237 to CPU 1210. Floppy drive, magnetic tape drive, CD-ROM drive, DVD Drive, Flash memory, removable memory chip (PCMCIA Card, EPROM) are examples of such removable storage drive 1237.

Removable storage unit 1240 may be implemented using medium and storage format compatible with removable storage drive 1237 such that removable storage drive 1237 can read the data and instructions. Thus, removable storage unit 1240 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 1240 or hard disk installed in hard drive 1235. These computer program products are means for providing software to digital processing system 1200. CPU 1210 may retrieve the software instructions, and execute the instructions to provide various features of the present invention described above.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

10. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures, modules and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computing system comprising:
a first client system to form and send an email upon a first user specifying a task to be performed and a distribution list, wherein said email contains a header portion and a body portion,
said email specifying said task and said distribution list, said distribution list being represented in the form of a single email address in an address field of said header portion in said email, said body portion of said email containing a pre-specified tag to expressly indicate that said email is related to management of said task;
a server system operable to;
maintain a distribution data mapping each of a plurality of distribution lists to a corresponding list of recipients, each of said list of recipients containing more than one recipient;
receive said email including said pre-specified tag in said body portion, said email also including said single email address representing said distribution list in said header portion;
examine said distribution data to identify one of said plurality of distribution lists matching said single email address, wherein a list of recipients mapped to said identified one of said plurality of distribution lists represents said distribution list, said list of recipients containing more than one email address to specify corresponding recipients, said examine also identifying said pre-specified tag in said body portion of said email,
upon identification of said at least one tag in said body portion, automatically determining said email as relating to task management;
forward said email for management of said task to each of said list of recipients represented by said distribution list in response to said single email address and said pre-specified tag in said email such that more than one recipient receives said email in response to said single email address;

create an entry in a status table for said task in response to receiving said first email, wherein said current status is stored in said entry;

insert, upon identification of said pre-specified tag in said body portion, a unique identifier in said first email prior to said forwarding, said unique identifier uniquely identifying said task, said unique identifier also being stored in said entry of said status table; and maintain status data indicating a current status of said task in response to said task being specified in said email; and a second client system of one of said list of recipients to receive said email forwarded by said server system, and for sending a response email to said server system with a status update related to said task, wherein said server system examines said response email for said unique identifier to determine that said response email is related to said task and updates said current status of said task according to said status update in said response email after receiving said status update if said response email is determined to be related to said task, wherein at least one of said first client system, said server system and said second client system comprises a processor to execute instructions.

2. The computing system of claim 1, further comprising a third client system, wherein said third client system logs into said server system to retrieve said current status.

3. The computing system of claim 1, wherein another tag present in said body portion specifies that said task is to be performed by a specific set of persons, wherein said task manager block is designed to maintain status information with respect to each of said specific set of persons for said task, wherein said task manager block is designed to check whether a sender of said response email is contained in said specific set of persons before updating said current status in said status table based on the status update.

4. The computing system of claim 1, further comprising a third client system designed to send a second email related to a second task containing a first sub-task and a second sub-task, said second email specifying that a first set of assignees to perform said first sub-task and a second set of assignees to perform said second subtask, wherein said second task, said first sub-task, said second sub-task, said first set of assignees, and said second set of assignees are specified in the form of tags contained in the body portion of said second email, said task manager block to store current status information for each of said first sub-task and said second sub-task in said status table.

5. The computing system of claim 1, wherein each of said first client system and said second client systems contains a plug-in, wherein the plug-in in said first client system is designed to insert said at least one tag into said email prior to sending said email to said server system, wherein said plug-in in said second client system is designed to insert both of said at least one tag and said unique identifier into said response email before sending said response email to said server system.

6. The computing system of claim 5, wherein said plug-in in said second client system is operable to:

when said first user replies to said email, check whether said current status indicates that said task is completed;

if said current status indicates that said task is completed, query a user at said second client system whether said task is to be reopened; and to cause a third email to be sent to a second server indicating that said task is to be reopened if said user at said second client system so responds.

7. The computing system of claim 1, wherein said email further contains a second tag also in said body portion, said second tag specifying a list of assignees, wherein said server system ensures that said one of said list of recipients is one of said list of assignees before updating said current status of said task.

8. A computer-implemented method for managing tasks among one or more users of client systems, said method being implemented in a server system, said method comprising:

maintaining a distribution data mapping each of a plurality of distribution lists to a corresponding list of recipients, each of said list of recipients containing more than one recipient;

receiving from a first client system a first email formed by a first user of said first client system, said first email specifying a task to be performed as well as a distribution list in the form of single email address in an address field of a header portion in said first email, a body portion of said first email containing a pre-specified tag to expressly indicate that said email is related to management of said task;

examining said distribution data to identify one of said plurality of distribution lists matching said single email address, wherein a list of recipients mapped to said identified one of said plurality of distribution lists represents said distribution list, said list of recipients containing more than one email address to specify corresponding recipients, said examining also identifying said pre-specified tag in said body portion of said first email;

upon identification of said pre-specified tag in said body portion, automatically determining said first email as relating to task management;

forwarding said first email for management of said task to each of said list of recipients represented by said distribution list in response to said single email address and said pre-specified tag in said first email such that more than one recipient receives said first email in response to said single email address;

creating an entry in a status table for said task in response to receiving said first email, wherein said current status is stored in said entry;

inserting, upon identification of said pre-specified tag in said body portion, a unique identifier in said first email prior to said forwarding, said unique identifier uniquely identifying said task, said unique identifier also being stored in said entry of said status table;

receiving from a second client system a response email formed by a second user of said second client system, said response email containing a status update in the performance of said task, wherein said second user is included in said list of recipients;

examining said response email for said unique identifier to determine that said response email is related to said task; and maintaining information specifying a current status of said task, wherein said maintaining updates said current status according to said status update in said response email if said response email is determined to be related to said task.

9. The computer-implemented method of claim 8, further comprising:
receiving a second email not containing said tag; and
determining that said second email is a plain email not related to task management based on absence of said tag in said second email.

10. The computer-implemented method of claim 8, further comprising:
permitting said one or more users to log into said server system and to retrieve said current status such that said information can be viewed centrally by said list of recipients and said first user.

11. The computer-implemented method of claim 10, wherein said first email contains a second pre-specified tag in said body portion to specify that said task is to be performed by specific ones of said one or more users, wherein said server system is designed to maintain status information with respect to each of said specific ones of said one or more users.

12. The computer-implemented method of claim 8, wherein said first email further contains a second tag also in said body portion, said second tag specifying a list of assignees, wherein said server system ensures that said one of said list of recipients is one of said list of assignees before updating said current status of said task.

13. A non-transitory machine readable medium storing one or more sequences of instructions for causing a server system to facilitate management of tasks, wherein execution of said one or more sequences of instructions by one or more processors contained in said server system causes said server system to perform the actions of:
maintaining a distribution data mapping each of a plurality of distribution lists to a corresponding list of recipients, each of said list of recipients containing more than one recipient;
receiving from a first client system a first email formed by a first user of said first client system, said first email specifying a task to be performed as well as a distribution list in the form of a single email address, said first email containing a header portion and a body portion, said header portion specifying said single email address in an address field, said body portion containing a first pre-specified tag which identifies that said first email is related to management of tasks;
examining said distribution data to identify one of said plurality of distribution lists matching said single email address, wherein a list of recipients mapped to said identified one of said plurality of distribution lists represents said distribution list, said list of recipients containing more than one email address to specify corresponding recipients, said examining also identifying said first pre-specified tag in said body portion of said first email;
upon identification of said first pre-specified tag in said body portion, automatically determining said first email as relating to task management;
forwarding said first email for management of said task to each of said list of recipients represented by said distribution list in response to said single email address in said first email such that more than one recipient receives said first email in response to said single email address;
creating an entry in a status table for said task in response to receiving said first email, wherein said current status is stored in said entry;
inserting, upon identification of said first pre-specified tag in said body portion, a unique identifier in said first email prior to said forwarding, said unique identifier uniquely identifying said task, said unique identifier also being stored in said entry of said status table;
receiving from a second client system a response email formed by a second user of said second client system, said response email containing a status update in the performance of said task, wherein said second user is included in said list of recipients;
examining said response email for said unique identifier to determine that said response email is related to said task; and
maintaining information specifying a current status of said task, wherein said maintaining updates said current status according to said status update in said response email if said response email is determined to be related to said task.

14. The non-transitory machine readable medium of claim 13, said machine readable medium containing additional instructions for:
receiving a second email not containing said first pre-specified tag; and
determining that said second email is a plain email not related to task management based on absence of said first pre-specified tag in said second email.

15. The non-transitory machine readable medium of claim 13, further comprising:
permitting any of said first user and said list of recipients to log into said server system and to retrieve said current status such that said status information can be viewed centrally by said list of recipients and said first user.

16. The non-transitory machine readable method of claim 15, wherein said first email contains, in said body portion, a second pre-specified tag having a project identifier as a parameter, said machine readable medium comprising additional instructions for:
storing said project identifier also in said entry such that the information in said entry can be identified with said task.

17. The non-transitory machine readable medium of claim 15, wherein said first email contains a third pre-specified tag specifying that said task is to be performed by specific ones of said recipients, wherein said server system is designed to maintain status information with respect to each of said specific ones of said recipients.

18. The non-transitory machine readable medium of claim 13, wherein said first email further contains a second tag also in said body portion, said second tag specifying a list of assignees, wherein said server system ensures that said one of said list of recipients is one of said list of assignees before updating said current status of said task.

19. A server system to facilitate management of tasks, said server system comprising:
one or more processors; and
a random access memory (RAM) to store instructions,
wherein said one or more processors retrieve said instructions and execute said instructions, wherein execution of said instructions causes said server system to perform the actions of:
maintaining a distribution data mapping each of a plurality of distribution lists to a corresponding list of recipients, each of said list of recipients containing more than one recipient;
receiving from a first client system a first email formed by a first user of said first client system, said first email specifying a task to be performed as well as a distribution list in the form of a single email address, said first email containing a header portion and a body portion, said header portion specifying said single email address in an address field, said body portion containing a first pre-specified tag which identifies that said first email is related to management of tasks;

examining said distribution data to identify one of said plurality of distribution lists matching said single email address, wherein a list of recipients mapped to said identified one of said plurality of distribution lists represents said distribution list, said list of recipients containing more than one email address to specify corresponding recipients, said examining also identifying said first pre-specified tag in said body portion of said first email;

upon identification of said first pre-specified tag in said body portion, automatically determining said first email as relating to task management;

forwarding said first email for management of said task to each of said list of recipients represented by said distribution list in response to said single email address in said first email such that more than one recipient receives said first email in response to said single email address;

creating an entry in a status table for said task in response to receiving said first email, wherein said current status is stored in said entry;

inserting, upon identification of said first pre-specified tag in said body portion, a unique identifier in said first email prior to said forwarding, said unique identifier uniquely identifying said task, said unique identifier also being stored in said entry of said status table;

receiving from a second client system a response email formed by a second user of said second client system, said response email containing a status update in the performance of said task, wherein said second user is included in said list of recipients;

examining said response email for said unique identifier to determine that said response email is related to said task; and maintaining information specifying a current status of said task, wherein said maintaining updates said current status according to said status update in said response email if said response email is determined to be related to said task.

20. The system of claim 19, further comprising:

receiving a second email not containing said first pre-specified tag; and determining that said second email is a plain email not related to task management based on absence of said first pre-specified tag in said second email.

21. The system of claim 19, further comprising:

permitting any of said first user and said list of recipients to log into said server system and to retrieve said current status such that said status information can be viewed centrally by said list of recipients and said first user.

22. The system of claim 21, wherein said first email contains, in said body portion, a second pre-specified tag having a project identifier as a parameter, said machine readable medium comprising additional instructions for:

storing said project identifier also in said entry such that the information in said entry can be identified with said task.

23. The system of claim 21, wherein said first email contains a third pre-specified tag specifying that said task is to be performed by specific ones of said recipients, wherein said server system is designed to maintain status information with respect to each of said specific ones of said recipients.

24. The system of claim 19, wherein said first email further contains a second tag also in said body portion, said second tag specifying a list of assignees, wherein said server system ensures that said one of said list of recipients is one of said list of assignees before updating said current status of said task.

* * * * *